Dec. 29, 1931.  H. F. FISHER  1,838,925
DEHYDRATOR HAVING MEANS FOR PROVIDING INTERNAL DRY OIL CIRCULATION
Filed Oct. 25, 1926
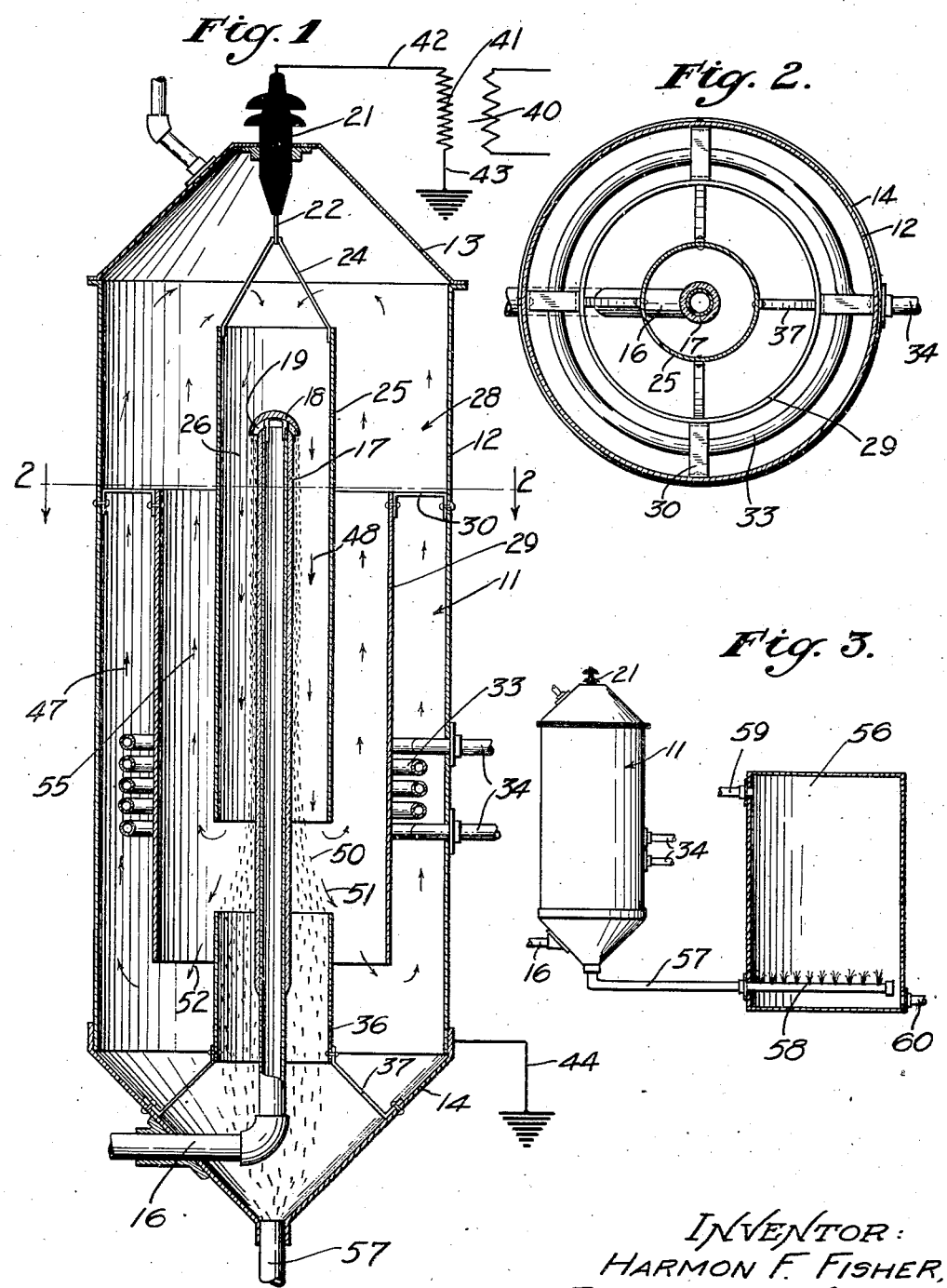
INVENTOR:
HARMON F. FISHER,
BY Fred W Lauri
ATTORNEY.

Patented Dec. 29, 1931

1,838,925

UNITED STATES PATENT OFFICE

HARMON F. FISHER, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

DEHYDRATOR HAVING MEANS FOR PROVIDING INTERNAL DRY OIL CIRCULATION

Application filed October 25, 1926. Serial No. 143,934.

My invention relates to electrical dehydrators and particularly to an electrical dehydrator which is adapted for treating wet emulsions.

In the petroleum industry it is common practice to separate the water from the petroleum of the petroleum emulsion by use of an electrical dehydrator. An electrical dehydrator of the type generally used consists of a tank in which grounded and live electrodes are situated, there being a treating space provided between these electrodes through which the emulsion to be treated is passed. An electric field is set up between the electrodes and the suspended water particles of the emulsion are coalesced into masses which have sufficient weight to gravitate to the bottom of the tank. The dry oil passes to the upper end of the tank where it is withdrawn therefrom.

In the ordinary dehydrator wet emulsions cannot be economically and successfully treated because of the chaining up of the water particles between electrodes, this drawing a heavy current and preventing a high potential gradient field from being established. It is well known that an electric field of high potential gradient must be established between the electrodes in order that the water particles be effectively agglomerated and the emulsion be thoroughly dehydrated.

It is one of the objects of this invention to provide an electrical dehydrator in which short-circuiting chains cannot be formed between the grounded electrodes and the live electrodes. In my invention I accomplish this object by forming a dielectric barrier of treated oil between the emulsion to be treated and one of the electrodes. I find it very satisfactory to use a dry petroleum for this purpose since it automatically renews itself if punctured and any mixing thereof with the emulsion will not impair the quality of the de-emulsified petroleum.

A still further object of this invention is to provide a dehydrator having the characteristics specified heretofore in which the dielectric barrier is heated to assist in the circulation thereof and the separation of water particles therefrom.

It is a still further object of this invention to provide a dehydrator having various features of construction which will appear in the following specification.

Still further objects of the invention lie in the provision of a novel method of dehydration, wherein the temperature of the incoming emulsion is different from that of the dielectric barrier.

Other objects and advantages of this invention will be made evident hereinafter.

Referring to the drawings in which I illustrate a preferred embodiment of the invention:

Fig. 1 is a vertical section taken through the dehydrator.

Fig. 2 is a cross section taken on the line 2—2 of Fig. 1 in the direction of the indicating arrows.

Fig. 3 is a diagrammatic view showing a complete dehydrating apparatus.

Referring in detail to Figs. 1 and 2 the dehydrator of my invention has a tank 11 which consists of a cylindrical shell 12, a tight top 13 and a tight bottom 14. Extended into the tank 11 through the tight bottom 14 is an emulsion inlet pipe 16. The emulsion inlet pipe 16 is extended centrally upward in the tank 11 and is provided with a hygroscopic coating 17, which serves as a central grounded electrode for the apparatus. The upper end of the inlet 16, this inlet 16 being in the form of a pipe, is provided with a cover 18 which provides a downward directed mouth 19. The downward directed mouth 19 causes the emulsion flowing from the upper end of the inlet 16 to flow downward along the surface of the central electrode 17.

Extended into the tank 11 through the tight top 13 is an insulator 21 which supports a rod 22. The rod 22 has arms 24 attached thereto, which arms 24 serve the purpose of supporting an outer live electrode 25. The live electrode 25 is provided in the form of a cylinder which is open at the top and bottom and which surrounds the central grounded electrode 17. A treating space 26 is provided between the grounded and live electrodes 17 and 25. Surrounding the live electrode 25 is an outer space 28 and supported in the outer space 28 is an annular circulation baffle 29. The annular circulation baffle 29 is supported by suitable brackets 30 which are attached thereto and to the shell 12 of the tank 11. The upper end of the circulation baffle 29 terminates a distance below the upper end of the live electrode 25, and the lower end of the circulation baffle terminates considerably below the lower end of the live electrode. Located in the space 28 between the circulation baffle 29 and the shell 12 is a heater provided in the form of a steam coil 33 having pipes 34 connected thereto, which pipes 34 extend outward through the shell 12. The heater 33 is mounted adjacent to the lower end of the live electrode 25. Surrounding the lower end of the central electrode 17 is a confining tube 36 which is supported by straps 37, these straps 37 being attached to the confining tube and to the tight bottom 14 of the tank 11. The confining tube 36 is about the same diameter as the live electrode 25 and the upper end thereof is higher than the lower end of the circulation baffle 29. In Fig. 1 I show a transformer 40, the secondary 41 of which is connected to the rod 22 by means of a wire 42. The secondary 41 is also grounded by means of a wire 43. The tank 11 is grounded as indicated at 44, and the emulsion inlet 16 and the central electrode being connected to the tank 11 are also grounded. The electrode 25 being insulated from the tank 11 is a high tension electrode.

When starting up the apparatus the tank 11 is filled with a dielectric barrier which is preferably in the form of a dry oil and is preferably hot. The dry hot oil may be introduced through the emulsion inlet 16. After the tank 11 is filled with dry oil, cold emulsion may be introduced into the tank through the emulsion inlet 16. The cold emulsion which consists of petroleum and water particles suspended therein are directed downward along the surface of the central electrode 17 by the cover 18. The direction given to the emulsion tends to cause it to hang to the area immediately surrounding the grounded electrode 17.

At the time of introduction of emulsion into the tank the circuit to the transformer 40 is completed and a high voltage electric field is established in the treating space 26. In commercial plants this may be in the neighborhood of 11,000 volts. The heater 33 is also supplied with steam so that the dry oil surrounding the heater will be raised in temperature, this causing it to move upward in the outer space 28 between the circulation baffle 29 and the shell 12 as indicated by arrows 47. The emulsion to be treated passes downward in the treating space 26 as indicated by arrows 48 in Fig. 1. The contact of the cold emulsion with the dry oil which is at this time in the treating space 26 cools the dry oil and causes it to drop. The heated dry oil which passes upward, as indicated by the arrows 47, enters the upper end of the live electrode 25 and passes downward through the treating space 26. A circulation of the dry oil is thus produced in the tank 11. The heater 33 heats the oil and causes it to move upward in the outer space 28 between the circulation baffle and the shell 12 and the cool emulsion contacts the dry oil in the treating space 26, cooling it and causing it to fall. The emulsion in passing downward through the treating space 26 is acted upon by the electric field and the water particles are agglomerated into masses of water which have sufficient weight to settle out of the oil. The treated emulsion being heavier than the dry oil and being cooler than the hot dry oil moves downward as indicated by broken lines 50 in Fig. 1. The dry oil upon reaching the lower end of the treating space 26 tends to move outward as indicated by arrows 51. That portion of the dry oil which is nearest the emulsion is cooled the most and this cooled dry oil will drop downward as indicated by arrows 52, passing around the lower end of the circulation baffle 29 into the space between the baffle 29 and the shell 12. That portion of the dry oil which is farthest from the wet emulsion and adjacent to the live electrode 25 is not cooled as much as the other dry oil and will therefore tend to rise upward, as indicated by arrows 55, through the space between the live electrode 25 and the circulation baffle 29. The dry oil passing upward, as indicated by the arrows 47 and 55, join into a single stream and pass into the upper end of the live electrode 25. The dehydrated cold oil having the water masses therein tends to drop straight downward to the bottom of the tank 11. The circulation of the dry oil, however, tends to pull the dehydrated cold oil away from the central electrode 17 at the lower end of the treating space. To prevent the cold emulsion from being diffused to any great extent I provide a confining tube 36 which directs the cold dehydrated oil to the lower end of the tank 11. A treated oil outlet 57 is provided at the lower end of the tank 12 through which the treated cold emulsion passes along with the water masses. The pipe 57, as shown in Fig. 3, is extended to a settling tank 56 and is sprayed thereinto by a pipe 58. After settling has taken place dry treated oil is withdrawn from the upper end of the settling tank 56 through a pipe 59 and water is withdrawn from the lower end thereof through a pipe 60.

In actual practice I find that the type of dehydrator of my invention is very efficient in dehydrating wet emulsions. As pointed out heretofore the short-circuiting tendencies of wet emulsion is very high by reason of the high water content and therefore the ordinary dehydrator is very inefficient in operation and quite costly to operate because the short-circuiting of the electrodes causes a heavy current to flow. Such short-circuiting is prevented in my invention by the dielectric barrier; that is, by the dry oil which is circulated through the treating space 26. This dry oil prevents any short-circuiting whatsoever. It is possible that some water particles will be forced into the dry oil as it passes downward through the treating space 26 in contact with the emulsion. However, when the dry oil passes around the lower end of the circulation baffle 29, these water particles will continue to fall towards the bottom of the tank 11, whereas the dry oil moves upward around the lower end of the circulation baffle. The separation of water particles from the dry oil is very easy because of the fact that the dry oil is hot and its viscosity is quite low compared to that of oil at a normal temperature.

An important part of this invention resides in the means for circulating the dry oil through the treating space 26. The chief factor in this circulation is the heater 33 but it should be recognized that the cooling of the dry oil in the treating space 26 by contact with the cool emulsion is also active in assisting the circulation. The circulation baffle 29 is desirable since it provides a definite channel for the cooler of the dry oil to pass through. The position of the circulation baffle 29 to a certain extent governs the flow of the circulating dry oil and, if desired, means may be provided so that the baffle may be readily adjusted in position so as to change the rate of flow of the dry oil.

Certain features shown and described in the present application are broadly claimed in my co-pending applications Serial 135,804 and Serial 203,253, these features relating to the electrode structure per se.

I claim as my invention:

1. In a dehydrator of the class described the combination of: a tank containing a dielectric barrier; a central electrode in said tank; an outer electrode in said tank and around said central electrode, there being a vertically disposed treating space between said electrodes and open at its ends; means for introducing emulsion into said treating space; and a heater in the other space around said outer electrode for heating said dielectric barrier and thereby causing said dielectric barrier to circulate through said treating space in a closed path.

2. In a dehydrator of the class described the combination of: a tank; a central electrode in said tank; an outer electrode in said tank and around said central electrode, there being a treating space between said electrodes; means for introducing emulsion into said treating space; a heater in the outer space around said outer electrode for heating a dielectric barrier and thereby causing said dielectric barrier to circulate through said treating space; and a circulating baffle located between said heater and said outer electrode.

3. In a dehydrator of the class described the combination of: a tank; a central electrode in said tank; an outer electrode in said tank and around said central electrode, there being a treating space between said electrodes; means for introducing emulsion into a treating space; a heater in the outer space around said outer electrode for heating said dielectric barrier and thereby causing said dielectric barrier to rise in said outer space, said dielectric barrier dropping in said treating space and returning to said outer space to form a closed circulation path; and a circulating baffle located between said heater and said outer electrode.

4. In a dehydrator of the class described the combination of: a central electrode in said tank; an outer electrode around said central electrode, there being a treating space between said electrodes; means for introducing a stream of emulsion into said treating space adjacent to said central electrode; and thermal means for causing a dielectric barrier to circulate through said treating space and around said stream of emulsion.

5. In a dehydrator of the class described the combination of: a tank; a central electrode in said tank; an outer electrode in said tank and around said central electrode, there being a treating space between said electrodes; means for introducing emulsion into said treating space; a heater in the outer space around said outer electrode for heating a dielectric barrier and thereby causing said dielectric barrier to rise in said outer space, said dielectric barrier dropping in said treating space; a circulating baffle located between said heater and said outer electrode; and a confining tube surrounding said central electrode.

6. In a dehydrator of the class described, the combination of: primary and secondary electrodes forming a treating space therebetween; means for supplying an emulsion to said treating space; and a confining tube in alignment with said treating space and positioned in spaced relationship with one end thereof to confine a portion of the liquid issuing from said treating space.

7. A combination as defined in claim 6 including a circulating baffle surrounding at least a portion of said treating space and a portion of said confining tube, and including a heating device for heating the barrier fluid surrounding said circulating baffle.

8. A process of breaking an emulsion, which includes the steps of: forming an electric field of non-uniform intensity in a treating space; introducing a hot dielectric barrier fluid into that portion of said treating space which is of low intensity; and introducing a cold emulsion into that portion of said treating space wherein the intensity is the greatest and in contact with said hot dielectric barrier fluid.

9. In a dehydrator of the class described, the combination of: a live electrode; a grounded electrode, there being a treating space between said electrodes into which the fluid to be treated is introduced; and a grounded confining baffle spaced from one end of said live electrode and through which at least a portion of said fluid passes after treatment.

10. In a dehydrator for petroleum emulsions of oil and water, the combination of: a tank; means for delivering an emulsion of oil and water to said tank; an electrode in the central portion of said tank; means for setting up an electric field in the space between said central electrode and said tank, said electric field agglomerating the water phase of said emulsion which water phase drops to the bottom of said tank, the dry oil of said emulsion rising to the upper end of said tank; heating means positioned in a portion of said tank containing oil which is of higher dielectric strength than the incoming emulsion and comprising means for circulating this oil in a closed path through said electric field; means for withdrawing dry oil from said upper end of said tank; and withdrawal means for withdrawing liquid from said bottom of said tank.

11. In a dehydrator of the class described, the combination of: a sleeve-shaped electrode providing a vertically disposed space open at its ends and submerged in a liquid; means including another electrode for establishing an electric field adjacent said sleeve-shaped electrode; thermal means submerged in said liquid for heating said liquid adjacent said sleeve-shaped electrode and establishing a closed thermal circulation of said liquid through and around said sleeve-shaped electrode and thus through said electric field; and means for introducing the emulsion to be treated into said electric field so that said liquid and said emulsion flow therethrough side by side.

12. In a de-emulsifier, the combination of: a tank adapted to contain a liquid; a wall substantially separating a treating space in said tank from a space disposed laterally therefrom, said spaces being connected at their upper and lower ends; means for introducing an emulsion into said tank; means for drawing a separated phase of said emulsion from the bottom of said tank; means for drawing a separated phase of said emulsion from an upper portion of said tank; means in one of said spaces for heating the liquid therein to set up a closed circulation of liquid passing upward through one of said spaces and downward through the other of said spaces; and means for electrically treating said emulsion in one of said spaces to separate the phases thereof.

In testimony whereof, I have hereunto set my hand at Los Angeles, California, this 19th day of October, 1926.

HARMON F. FISHER.

CERTIFICATE OF CORRECTION.

Patent No. 1,838,925.  Granted December 29, 1931, to

HARMON F. FISHER.

It is hereby certified that error appears in the printed specification of the above numbered patent requiring correction as follows: Page 3, lines 85 and 86, claim 4, strike out the words "in said tank"; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.